(12) United States Patent
Paloschi et al.

(10) Patent No.: US 6,235,667 B1
(45) Date of Patent: May 22, 2001

(54) VITRIFIABLE MIXTURE FOR QUALITY GLASSES

(75) Inventors: Fabio Paloschi, Parma; Giancarlo Boschi, Siena, both of (IT)

(73) Assignee: CALP Cristalleria Artistica la Piana S.p.A. (IT)

( * ) Notice: Subject to any disclaimer, the term of this patent is extended or adjusted under 35 U.S.C. 154(b) by 0 days.

(21) Appl. No.: 09/328,303

(22) Filed: Jun. 8, 1999

Related U.S. Application Data

(63) Continuation-in-part of application No. 08/860,842, filed as application No. PCT/IT95/00215 on Dec. 11, 1995, now abandoned.

(30) Foreign Application Priority Data

Dec. 13, 1994 (IT) ............................................. FI94A0223

(51) Int. Cl.[7] ............................ C03C 3/078; C03C 3/085
(52) U.S. Cl. ................................ 501/72; 501/64; 501/67; 501/69; 501/70; 501/901; 501/903
(58) Field of Search ................................... 501/901, 903, 501/64, 67, 69, 70, 72

(56) References Cited

U.S. PATENT DOCUMENTS 4,098,596  7/1978  Wu .
5,468,693  * 11/1995  Comte ................................... 501/72

FOREIGN PATENT DOCUMENTS 0 553 586 A1    8/1993  (EP) .

OTHER PUBLICATIONS

Enomoto, Goro, Sep. 19, 1994, 121: 140000s *Optical Glass*, Chemical Abstracts.

* cited by examiner

Primary Examiner—Michael Marcheschi
(74) Attorney, Agent, or Firm—McGlew & Tuttle, P.C.

(57) ABSTRACT

A lead-free glass, which is suitable for use as imitation lead crystal tableware and decorative crystal glassware, has a chemical composition as a percentage by weight within the following range:

| | |
|---|---|
| silica 50–58 | zirconium oxide 0–5 |
| potash ($K_2O$) 0–13, e.g. 0–12 | yttrium oxide 0–5 |
| soda ($Na_2O$) 0–9 | alumina 0–3 |
| lithium oxide 0–4 | tin oxide 0–5 |
| calcium oxide 0–3 | lanthanum oxide 0–9 |
| magnesium oxide 0–4 | niobium oxide 0–9 |
| boric anhydride ($B_2O_3$) 0–2 | bismuth oxide 0–13, e.g. 0–12 |
| zinc oxide 16–30 | germanium oxide 0–5 |
| barium oxide 0–13, e.g. 0–12 | antimony oxide 0–1 |
| titanium oxide 0–6. | |

28 Claims, No Drawings

VITRIFIABLE MIXTURE FOR QUALITY GLASSES

CROSS REFERENCE TO RELATED APPLICATION

This is a continuation in part of U.S. application Ser. No. 08/860,842 filed Jun. 10, 1997, abandoned, which is a 371 of PCT/IT95/00215, filed Dec. 11, 1995.

BACKGROUND OF THE INVENTION

1. Field of the Invention

The present invention relates to the composition of a glass with the characteristics of lead crystal, but without the presence of lead, and more particularly to lead-free glass compositions especially suitable for the manufacturing of tableware and/or decorative crystal glassware articles of manufacture, which compositions are generally inexpensive and of improved workability and fusibility over a wide range of temperatures, and which articles are essentially not subject to devitrification at a temperature of about 650–1100° C.

All parts or percentages (%) in the compositions herein are by weight (% by weight) unless otherwise specifically indicated.

2. Description of the Prior Art

Lead crystal is well known as a glass characterized in particular by exceptional brilliance, refractive index, density and sonority.

According to the definition given by EEC standard 69/493— adopted in Italian Law No. 827 of 26/11/73, Annex b, columns e and f, line 2—for a glass to be called "lead crystal" it must among other things, i.e. as well as containing at least 24% of lead, have a density (d) greater than 2.90 g/cm$^3$ and a refractive index ($n_d$) greater than 1.545. These characteristics are insured by the lead content, which also endows the glass with good workability, sonority and gloss.

The need to invent a new glass with the same characteristics as crystal (i.e. lead crystal) arises from the fact that lead has already been banished from some production processes because of its potential toxicity and it is possible that this restriction will be extended in the near future.

For this reason, alternatives have been investigated for obtaining glasses without lead but with the physical characteristics of "crystal" stated above. To achieve this, the lead can be replaced by a mixture of elements such as barium, zinc, calcium, strontium, bismuth, titanium, and others which are less toxic and increase the values of density and refractive index. However, along with these properties, many of these elements have a high price and can impair the workability or color of the glass, so that their use can be unsuitable in industrial applications.

Researchers therefore have endeavored to determine the most favorable composition for obtaining "lead-free crystals" with characteristics suitable for both craft work and industrial processing, as for example the glass that is the subject of International Application WO 93/16964 (i.e. corresponding to EP 0 553 586 A1) in the name of Compagnie des Cristalleries de Baccarat, with the composition given in the following Table A.

This composition is characterized by replacement of the lead with a mixture of zinc, strontium and calcium, and the corresponding glass has a satisfactory density and refractive index, but it has proved to be difficult to work, as it has a high melting point and softening point and a devitrification temperature that is unsuitable for continuous melting.

TABLE A

| Oxides | % By Weight |
|---|---|
| $SiO_2$ | 53–58 |
| $Li_2O$ | 0–0.3 |
| $Na_2O$ | 4.5–7.5 |
| $K_2O$ | 6–10 |
| SrO | 0–12 |
| BaO | — |
| ZnO | 16–21 |
| SrO + CaO + ZnO | 26.5–31 |
| $Al_2O_3$ | 0–1.5 |
| $Sb_2O_3$ | 0.5–1.5 |
| $TiO_2$ | 0–2 |
| CaO | 0–9 |
| $SnO_2$ | 0–2.5 |
| $B_2O_3$ | 0–1.2 |
| $La_2O_3$ | 0–3 |

Another lead-free crystal is that envisaged in the European Patent Application published under No. 0 594 422 A1 in the name of Toyo Glass Co. Ltd., with the composition according to the following Table B. According to the invention of this European application, the lead is replaced by a mixture of barium, zinc, titanium and boron, and the glass has satisfactory values of the physical parameters, in particular density and refractive index, at reasonable cost.

TABLE B

| Oxides | % By Weight |
|---|---|
| $SiO_2$ | 50.0–60.0 |
| CaO | 1.0–5.0 |
| BaO | 10.0–15.0 |
| $Na_2O$ | 3.0–10.0 |
| $K_2O$ | 5.0–13.0 |
| $Li_2O$ | 0–1.0 |
| $TiO_2$ | 5.0–8.0 |
| ZnO | 5.0–10.0 |
| $ZrO_2$ | 0–2.0 |
| $B_2O_3$ | 1.0–2.0 |
| $Sb_2O_3$ | 0.3–0.8 |

However, glasses with the chemical composition given in this Table B can, because of the high titanium content, be difficult to decolorize and to work by hand.

A lead-free glass exhibiting characteristics of crystal is disclosed in U.S. Pat. No. 5,468,693 to Comte (Comte-693). The glass disclosed therein includes BaO and ZnO among the main components. Broad ranges of BaO (>13–21% by weight) and ZnO (5–15% by weight), together with SrO (0–<8% by weight, totalling 27–34% by weight SrO+BaO+ZnO), are disclosed, but substantially narrower preferred ranges of BaO (15–19% by weight) and ZnO (8–13% by weight), together with SrO (0–3% by weight, totalling 27–32% by weight SrO+BaO+ZnO), are shown to meet actually the required standards and quality features, the noted broader ranges being unsuitable to reach the requested density and/or refractive index values (see Table 4 hereinafter).

In addition to the need for avoiding the presence of lead while still keeping the required density (greater than 2.90 g/cm$^3$) and refractive index (greater than 1.545), additional requisites must be met by the lead-free glass, especially when it is used for the manufacture of tableware or the like. In particular, release of toxic compounds from the final article of manufacture produced with the lead-free composition must be avoided. Release of barium, which is the most dangerous (i.e. toxic) substance among those selected by the present invention, as noted hereinafter, must be reduced as far as possible. Additionally, devitrification must be avoided.

Devitrification is the formation of crystals of chemical compounds inside the liquid mass of fused glass, i.e. it is the removal of transparency from the glass due to crystallization. Depending upon the chemical composition of the glass, devitrification may start at different temperatures. The viscosity of the glass is a direct function of the temperature. It can thus be said that devitrification can occur at different values of viscosity depending upon the chemical composition of the glass.

Devitrification is detrimental and highly undesired. The presence of chemical crystals inside the otherwise amorphous mass of the eventually solidified, i.e. crystal, glass represents a defect in the final article of manufacture. Articles including crystals in the amorphous mass must be rejected, since they do not meet the high quality standards applied to this kind of products.

Glass compositions for the production of tableware articles having a unit weight variable in a wide range (e.g. from 50 gr to 3,000 gr and more) should be such that no devitrification occurs. In particular, for the production of articles of manufacture having high weight, such as vases or the like, the mass of fused glass must be workable without the risk of devitrification, down to rather low temperature values (i.e. viscosity values higher than 100,000 poises).

The viscosity value at which devitrification occurs is therefore an essential parameter of lead-free glass compositions. The higher the viscosity value (measured in poises), the better the glass composition is for the application in the production of glass crystal.

Release of barium from the solidified glass is determined by measuring, by means of flame atomic absorption spectra, the barium content in the extracting solution resulting from the application of the USP 23 standard.

It should be noted that small percentage variations in the compounds of the glass may lead to unforeseeable positive or negative effects on the most important parameters which must be taken into account when selecting a proper composition for the production of lead-free glass crystal, namely: density, index of refraction, devitrification, and release of toxic compounds. Positive effects on one of these parameters might be accompanied by undesired values for the other parameters.

Lead-free glasses have also been developed for other uses.

U.S. Pat. No. 4,106,946 to Ritze (Ritze-946) discloses a steep absorption edge filter glass containing at least 0.5% by weight of CdO, CdTe, ZnS, CdS, S and/or Se as colloidal coloring components for providing optical glass filters. Although the Ritze-946 glass does not contain lead, it constitutes a colored glass which is unsuitable for use in providing (generally colorless) lead-free crystal tableware and/or decorative crystal glassware articles U.S. Pat. No. 4,472,030 to Tachibana et al. (Tachibana-030) discloses a cesium containing optical glass, e.g. for the production of lenses, having 6–32% by weight of $Cs_2O$. The Tachibana-030 optical glass contemplates 0–2.5% by weight of PbO but requires the stated amount of $Cs_2O$ since, if less than 6% by weight of $Cs_2O$ is present the desired refractive index distribution of the glass cannot be obtained, whereas if more than 32% by weight of $Cs_2O$ is present the durability of the glass is reduced. The cesium ion concentration of the lens forming the optical glass gradually decreases radially outwardly from the central axis while a counterpart potassium ion concentration gradually increases in such direction and thus the glass is of non-constant and non-uniform quality and properties throughout its mass or extent.

This known glass of Tachibana-030 is hence characterized by a high content of cesium and has therefore a composition which is different from that of the present invention, i.e. wherein a constant and uniform concentration of the ions therein throughout the extent of the glass is contemplated as noted below, and which known glass would be unsuitable for the production of tableware or the like as contemplated for the glass of the present invention.

SUMMARY OF THE INVENTION

It is among the objects of the present invention to provide an essentially lead-free, substantially cesium-free and substantially colorless, e.g. decolorized, glass of improved workability and fusibility, having the characteristics of lead crystal without the presence of lead, and suitable for use as inexpensive imitation lead crystal tableware and decorative crystal glassware.

The various features of novelty which characterize the invention are pointed out with particularity in the claims annexed to and forming a part of this disclosure. For a better understanding of the invention, its operating advantages and specific objects attained by its uses, reference is made to the accompanying descriptive matter and examples in which preferred embodiments of the invention are illustrated.

DETAILED DESCRIPTION OF THE INVENTION

In order to overcome the drawbacks of the known lead-free glasses, in accordance with the present invention a composition (% by weight on an oxide basis) for a vitrifiable mixture has been devised according to the following Table 1:

TABLE 1

| Oxides | % By Weight | Oxides | % By Weight |
|---|---|---|---|
| $SiO_2$ | 50–58 | $TiO_2$ | 0–6 |
| $K_2O$ | 0–13 | $ZrO_2$ | 0–5 |
| $Na_2O$ | 0–9 | $Y_2O_3$ | 0–5 |
| $Li_2O$ | 0–4 | $Al_2O_3$ | 0–3 |
| CaO | 0–3 | $SnO_2$ | 0–5 |
| MgO | 0–4 | $La_2O_3$ | 0–9 |
| $B_2O_3$ | 0–2 | $Nb_2O_5$ | 0–9 |
| ZnO | 16–30 | $Bi_2O_3$ | 0–13 |
| BaO | 0–13 | $GeO_2$ | 0–5 |

In this composition, lead is replaced by a mixture comprising mainly zinc, plus barium, lanthanum, niobium and bismuth, to give a total content by weight of the oxides of these said elements that ranges from 26% to 33%, with the content of such oxides of barium and bismuth each being 0–13%, preferably 0–12%, by weight. The sum of these oxides excluding zinc must be between 7% and 14% by weight, and furthermore it is possible to add zirconium, yttrium and titanium with a total combined content of their oxides of less than 6% by weight for further improvement of the chemical resistance and refractive index of the glass.

Other features defining the mixture of oxides for formation of the glass according to the invention are:

the fact that the total weight content of $SiO_2$ and $Al_2O_3$ is between 52% and 58% to guarantee sufficient chemical resistance and to reduce the release of toxic compounds;

the fact that the total weight content of the oxides of potassium, sodium and lithium is between 12% and 18% to improve workability and fusibility. In this regard, devitrification is avoided in the range of viscosities where the glass composition has to be worked for the production of tableware, decorative crystal glassware and the like;

the fact that the molar ratio between $K_2O$ (sometimes termed potash) and $Na_2O$ (sometimes termed soda) is between 0.9 and 2 to insure low transfers of heavy metal ions;

the optional presence of at least one of the oxides of arsenic, antimony, nickel, cobalt, manganese, erbium, neodymium, selenium, and cerium, as refining and decolorizing agents, in a total quantity below 2% by weight, with the quantity of the oxide of antimony being 0–1% by weight;

the presence of alumina and of the oxides of calcium and magnesium in a total quantity below 4% by weight, to increase the hydrolysis resistance; and the presence of tin and germanium in a total amount by weight of up to 5%, to achieve the desired density and refractive index.

Thus, as to the composition content (%) per Table 1 above:

| | |
|---|---|
| $CaO + MgO + Al_2O_3$ | 0–4 |
| $TiO_2 + ZrO_2 + Y_2O_3$ | 0–6 |
| $SnO_2 + GeO_2$ | 0–5 |
| $BaO + La_2O_3 + Nb_2O_5 + Bi_2O_3$ | 7–14 |
| $SiO_2 + Al_2O_3$ | 52–58 |
| $K_2O + Na_2O + Li_2O$ | 12–18 |
| $ZnO + BaO + La_2O_3 + Nb_2O_5 + Bi_2O_3$ | 26–33 |
| $SiO_2 + K_2O + Na_2O + Li_2O + ZnO + BaO + Al_2O_3 + La_2O_3 + Nb_2O_5 + Bi_2O_3$ | at least 90. |

In particular, the composition further contains one or more of $Sb_2O_3$, $As_2O_3$, NiO, CoO, $MnO_2$, $Er_2O_3$, $Nd_2O_3$, SeO and $CeO_2$ as refining and decolorizing agents in a total amount of below 2% by weight, with the $Sb_2O_3$ content being 0–1% by weight.

Within the framework of the possible compositions in the range stated above per Table 1, the following are of particular interest:

Glass (A) —a glass with a composition (% by weight on an oxide basis) in the range shown in Table 2 below:

TABLE 2

| Oxides | % By Weight | Oxides | % By Weight |
|---|---|---|---|
| $SiO_2$ | 53–57 | ZnO | 16–22 |
| $K_2O$ | 7–12 | BaO | 7–13 |
| $Na_2O$ | 3–6 | $B_2O_3$ | 0–1 |
| $Li_2O$ | 0–2 | ZnO + BaO | 26–30 |
| $K_2O + Na_2O + Li_2O$ | 12–17 | $ZrO_2$ | 0–3 |
| MgO | 0–2 | $TiO_2 + ZrO_2$ | 0–6 |
| $TiO_2$ | 0–6 | $Sb_2O_3$ | 0–1 |

The oxides listed in Table 2 amount by weight to at least 91% of the contemplated glass.

These values correspond to glasses with density and refractive index equal to or greater than the values stipulated by the aforementioned EEC standard 69/493, at a reasonable cost, and with good chemical resistance, such as for example the following glasses 1–4 (% by weight on an oxide basis) in Table 2/1 below, which can be used as substitutes for lead crystal:

TABLE 2/1

| Oxides | % By Weight 1 | % By Weight 2 | % By Weight 3 | % By Weight 4 |
|---|---|---|---|---|
| $SiO_2$ | 53.5–54.5 | 55.5–56.5 | 54.5–55.5 | 53.5–54.5 |
| $K_2O$ | 7.5–8.5 | 8–9 | 7.5–8.5 | 10–11 |
| $Na_2O$ | 4.5–5.5 | 4–5 | 4.5–5.5 | 5–6 |
| ZnO | 18–19 | 16.5–17.5 | 16–16.5 | 18.5–19.5 |
| BaO | 9.5–10.5 | 10.5–11.5 | 10.5–11.5 | 9.5–10.5 |
| $Sb_2O_3$ | 0.22–0.27 | 0.73–0.77 | 0.73–0.77 | 0.73–0.77 |
| $TiO_2$ | 3.5–4.5 | 1.5–2.5 | 3.5–4.5 | — |

The oxides listed in Table 2/1 amount by weight to at least 96.72% of glass 1, at least 96.23% of glass 2, at least 97.23% of glass 3, and at least 97.23% of glass 4.

More particularly, the next table, Table 2/2 below, gives the specific compositions (% by weight on an oxide basis) and the measured values of some parameters of the glasses 1–4 with the composition according to the fields defined by Table 2/1 above:

TABLE 2/2

| | % By Weight 1 | % By Weight 2 | % By Weight 3 | % By Weight 4 |
|---|---|---|---|---|
| Oxides | | | | |
| $SiO_2$ | 54 | 56.25 | 55 | 54.15 |
| $K_2O$ | 7.84 | 8.50 | 7.84 | 10.8 |
| $Na_2O$ | 5.16 | 4.5 | 5.16 | 5.5 |
| ZnO | 18.5 | 17 | 16 | 18.8 |
| BaO | 10 | 11 | 11 | 10 |
| $Sb_2O_3$ | 0.25 | 0.75 | 0.75 | 0.75 |
| $TiO_2$ | 4.25 | 2 | 4.25 | — |
| $K_2O + Na_2O + Li_2O$ | 13 | 13.0 | 13 | 16.3 |
| ZnO + BaO | 28.5 | 28 | 27 | 28.8 |
| Values: | | | | |
| D.I.N. 12111 | 0.12 | 0.14 | 0.13 | 0.30 |
| d | 2.9575 | 2.9316 | 2.9441 | 2.938 |
| $n_d$ | 1.5720 | 1.5570 | 1.5695 | 1.5510 |
| α | 91.8 | 90.5 | 89 | 103.0 |
| Abbe n° | 50.5 | 55.3 | 53.5 | 53 |
| Tg | 563 | 569 | 567 | 523 |
| Mg | 635 | 626 | 632 | 600 |

In this and subsequent tables, values are given for the various glasses, with the pertinent notations defined as follows:

"D.I.N. 12111" is the value of the chemical resistance measured according to that standard;

"d" is the density in $kg/dm^3$ measured according to ASTM standard C729-75;

"α" is the value of the coefficient of thermal expansion in $°C.^{-1}10^{-6}$, according to UNI standard 7460 in the range 0–300;

"Tg" is the glass transition temperature in ° C.;

"Mg" is the softening temperature in ° C.; and

"Abbe No." is the value of the expression $(n_D-1)/(n_F-n_c)$, the Abbe number being an index of optical dispersion, with low values of the index corresponding to increased dispersions. The Abbe number must be kept at low values and preferably below 56, e.g. between 50 and 55.

Per Table 2/2, the (A) glass composition desirably contains by weight 54–56.3% $SiO_2$, 7.8–11% $K_2O$, 4–6% $Na_2O$, 16–19% ZnO, 10–11% BaO, 0.2–0.8% $Sb_2O_3$ and 0–4.3% $TiO_2$, with the total content of $K_2O$ and $Na_2O$ being 13–17% and the total content of ZnO and BaO being 27–29%.

Glass (B) —a glass which, in comparison with the preceding one, i.e. Glass (A), has a lower quantity of barium, and therefore an expected lower barium release, and which is of better quality—with equal or better physical parameters, such as sonority and dispersion, but a much higher cost, according to the following restricted range of composition (% by weight on an oxide basis) in Table 3:

TABLE 3

| Oxides | % By Weight | Oxides | % By Weight |
|---|---|---|---|
| $SiO_2$ | 53–57 | $TiO_2$ | 0–6 |
| $K_2O$ | 7–12 | $Bi_2O_3$ | 1–13 |
| $Na_2O$ | 3–6 | $Bi_2O_3$ + ZnO + BaO | 26–30 |
| $Li_2O$ | 0–1 | $Bi_2O_3$ + BaO | 7–14 |
| $K_2O + Na_2O + Li_2O$ | 12–17 | $B_2O_3$ | 0–1 |
| $Al_2O_3$ | 0–1 | $ZrO_2$ | 0–2 |
| $SiO_2 + Al_2O_3$ | 53–57 | $Y_2O_3$ | 0–1 |
| ZnO | 16–22 | $TiO_2 + Y_2O_3 + ZrO_2$ | 0–6 |
| BaO | 0–13 | $Sb_2O_3$ | 0–1 |

The oxides listed in Table 3 amount by weight to at least 91% of the contemplated glass.

The next table, i.e. Table 3/1 below, shows two ranges of compositions (% by weight on an oxide basis) of glasses 5–6 according to this last, restricted field:

TABLE 3/1

| Oxides | % By Weight 5 | % By Weight 6 |
|---|---|---|
| $SiO_2$ | 54.5–55.5 | 54.5–55.5 |
| $K_2O$ | 10.5–11.5 | 10.5–11.5 |
| $Na_2O$ | 5–6 | 5–6 |
| ZnO | 18.5–19.5 | 18.5–19.5 |
| BaO | 5.5–6.5 | — |
| $Bi_2O_3$ | 2.5–3.5 | 8.5–9.5 |
| $Sb_2O_3$ | 0.73–0.77 | 0.73–0.77 |

The oxides listed in Table 3/1 amount by weight to at least 97.23% of glass 5, and at least 97.73% of glass 6.

More particularly, Table 3/2 shown below gives the compositions (% by weight on an oxide basis) and the measured values of some parameters of the two glasses 5–6 possessing compositions according to the ranges defined in Table 3/1 above:

TABLE 3/2

| | % By Weight 5 | % By Weight 6 |
|---|---|---|
| Oxides | | |
| $SiO_2$ | 55.15 | 55.15 |
| $K_2O$ | 10.8 | 10.8 |
| $Na_2O$ | 5.5 | 5.5 |
| ZnO | 18.8 | 18.8 |
| BaO | 6 | — |
| $Bi_2O_3$ | 3 | 9 |
| $Sb_2O_3$ | 0.75 | 0.75 |
| $K_2O + Na_2O + Li_2O$ | 16.3 | 16.3 |
| $ZnO + BaO + Bi_2O_3 + Nb_2O_5$ | 27.8 | 27.8 |
| $BaO + Bi_2O_3 + Nb_2O_5$ | 9 | 9 |
| $SiO_2 + Al_2O_3$ | 55.15 | 55.15 |
| Values: | | |
| D.I.N. 12111 | 0.24 | 0.26 |
| d | 2.911 | 2.939 |
| $n_d$ | 1.5495 | 1.5570 |
| α | 98.0 | 97.7 |

TABLE 3/2-continued

| | % By Weight 5 | % By Weight 6 |
|---|---|---|
| Abbe n° | 55 | 52.5 |
| Tg | 528 | 529 |
| Mg | 617 | 609 |

Per Table 3/2, the (B) glass composition desirably contains by weight 55–56% $SiO_2$, 10–11% $K_2O$, 5–6% $Na_2O$, 18–19% ZnO, 0–6% BaO, 0.2–0.8% $Sb_2O_3$ and 3–9% $Bi_2O_3$, with the total content of $K_2O$, $Na_2O$ and $Li_2O$ being 16–17%, the total content of ZnO, BaO, $Bi_2O_3$ and $Nb_2O_5$ being 27–28%, the total content of BaO, $Bi_2O_3$ and $Nb_2O_5$ being 8–10%, and the total content of $SiO_2$ and $Al_2O_3$ being 55–56%.

It can be seen from the two examples of glasses 5 and 6 given above that simply on replacing barium with bismuth there is an increase in optical dispersion.

Tests that have been carried out show that with suitable combinations of oxides it is possible to achieve values of the parameters that are comparable to those of lead crystal, benefiting from one or more of the following characteristics, depending on the circumstances: lower price (inexpensiveness) of the product, workability, color and optical dispersion. Moreover, the composition range stated is able to produce glasses with improved optical qualities, high density, considerable chemical resistance and reduced release of toxic elements (i.e. generally without the significant use of potentially toxic or polluting elements); the specific sub-ranges described above define compositions that are particularly interesting from the standpoint of industrial manufacture and/or of the marketplace.

Comparative tests with compositions as disclosed in said U.S. Pat. No. 5,468,693 to Comte (Comte-693) show that the compositions of the present invention unexpectedly lead to better overall values in terms of the absence of devitrification, and in terms of density, refractive index and reduced release of barium.

The following comparative table, i.e. Table 4, shows how the main parameters of the glass composition (% by weight on an oxide basis) are affected by the variation of the BaO and ZnO percentages. Examples A, B and C of Table 4 generally correspond to glass compositions according to said Comte-693, with the BaO and ZnO percentages generally falling within the broader range disclosed. Examples 1, 2, 3 and 4 of Table 4 show compositions according to the present invention. Examples 1 and 3 have the same composition as Example A except for the BaO and ZnO content. Example 2 has the same composition as Examples B and C except for the BaO and ZnO content. Example 4 shows an additional composition falling within the scope of the present invention.

For each example of Table 4, the following parameters are given:

density;

refractive index nD;

barium release (according to U.S.P. 23 standard); and density of fused glass at which devitrification occurs (poises liquidus).

TABLE 4

|  | Wt. % Ex. A | Wt. % Ex. B | Wt. % Ex. C | Wt. % Ex. 1 | Wt. % Ex. 2 | Wt. % Ex. 3 | Wt. % Ex. 4 |
|---|---|---|---|---|---|---|---|
| Oxides | | | | | | | |
| $SiO_2$ | 57.50 | 58.40 | 58.40 | 57.40 | 58.40 | 57.40 | 56.80 |
| $K_2O$ | 7.10 | 7.10 | 7.10 | 7.10 | 7.10 | 7.10 | 8.60 |
| $Na_2O$ | 4.80 | 4.80 | 4.80 | 4.80 | 4.80 | 4.80 | 3.90 |
| BaO | 17.7 | 15.00 | 13.00 | 13.00 | 12.00 | 12.00 | 12.00 |
| ZnO | 11.20 | 13.00 | 15.00 | 16.00 | 16.00 | 17.00 | 17.50 |
| $Al_2O_3$ | 1.00 | 1.00 | 1.00 | 1.00 | 1.00 | 1.00 | — |
| $B_2O_3$ | — | — | — | — | — | — | — |
| $TiO_2$ | — | — | — | — | — | — | 0.50 |
| $Li_2O$ | 0.40 | 0.40 | 0.40 | 0.40 | 0.40 | 0.40 | 0.40 |
| $Sb_2O_3$ | 0.30 | 0.30 | 0.30 | 0.30 | 0.30 | 0.30 | 0.30 |
| Values: | | | | | | | |
| Density | 2.9190 | 2.9124 | 2.8990 | 2.9170 | 2.9124 | 2.9357 | 2.9360 |
| nD | 1.5467 | 1.5452 | 1.5447 | 1.5478 | 1.5451 | 1.5550 | 1.5520 |
| U.S.P. 23 | 66.56 ppm Ba | 53.64 ppm Ba | 33.12 ppm Ba | 28.22 ppm Ba | 26.31 ppm Ba | 25.18 ppm Ba | 22.75 ppm Ba |
| Poises Liquidus | 14,000 | 100,000 | No Devitrification (650–1100° C.) | No Devitrification (650–1100° C.) | No Devitrification (650–1100° C.) | No Devitrification (650–1100° C.) | >1,000,000 |

A comparison between Example A on the one hand and Examples 1 and 3 on the other shows that by simply changing the content of ZnO and BaO substantial advantage is obtained: in Example 1 no devitrification occurs in the temperature range of 650–1100° C., and the release of barium is reduced from 66.56 ppm (Example A) to 28.22 ppm (Example 1) and 25.18 ppm (Example 3), respectively.

Example B compared to Example 2 shows the same advantage: the release of barium is reduced by more than 50% (from 53.64 ppm to 26.31 ppm). No devitrification occurs with the composition of Example 2, while the composition of Example B shows devitrification at a viscosity of 100,000 poises.

Example C shows that if the content of BaO is reduced to 13% by weight and the ZnO % by weight is kept below 16% by weight, the required density (greater than 2.90 g/cm³) and refractive index (greater than 1.545) values cannot be reached with the composition of the prior art per Comte-693.

It is to be noted that Comte-693 actually requires a BaO content of greater than 13% by weight (>13–21%) and a ZnO content of only 5–15%, i.e. less than 16%, by weight, whereas Example C involves a BaO content of only 13% by weight with a ZnO content of 15% by weight.

Examples A, B and C show that by decreasing the BaO/ZnO ratio an improvement of devitrification (reduction of devitrification) and a reduction of barium release are obtained, but only against an unacceptable reduction of the density (d) and refractive index (nD) values. Indeed, Example C surprisingly shows density and refractive index values which are lower than those required (2.90 and 1.545, respectively) for "crystal" glass.

The compositions according to the present invention surprisingly show that, in a suitable range of composition, the further reduction of the BaO/ZnO ratio allows the obtaining at the same time of acceptable values for all the desired parameters: density, refractive index, barium release and devitrification, unlike the prior art.

In particular, in addition to a $K_2O/Na_2O$ molar ratio of 0.9–2:1, the compositions according to the present invention have a BaO/ZnO molar ratio of below 0.44:1, and more specifically 0.14–0.43:1. Whereas the BaO/ZnO molar ratios of Table 4 Examples 1–4 are 0.43:1 (Example 1), 0.40:1 (Example 2), 0.37:1 (Example 3) and 0.36 (Example 4), respectively, the BaO/ZnO molar ratios of Table 4 Examples A–C are 0.80:1 (Example A), 0.61:1 (Example B) and 0.46 (Example C), respectively. As aforesaid, Example C has a BaO content of only 13% by weight, whereas Comte-693 requires a minimum of more than 13% by weight BaO.

On a weight basis, the BaO/ZnO weight ratio according to the present invention is desirably 0.26–0.81:1. Likewise, on a weight basis, the $K_2O/Na_2O$ weight ratio according to the present invention is desirably 1.4–3:1.

The composition of the present invention is generally a lead-free and cesium-free, decolorized glass of improved workability and fusibility, containing one or more of $Sb_2O_3$, $As_2O_3$, NiO, CoO, $MnO_2$, $Er_2O_3$, $Nd_2O_3$, SeO and $CeO_2$ as refining and decolorizing agents in a total amount of below 2% by weight, with the $Sb_2O_3$ content being 0–1% by weight, although the glass composition may optionally be only substantially free of cesium, i.e. may contain at most 1%, e.g. 0–1%, by weight $Cs_2O$ as an impurity.

The glass composition of the present invention is also desirably strontium-free, and desirably includes $TiO_2$, e.g. in an amount of 1–6% by weight, and $Bi_2O_3$, e.g. in an amount of 1–13%, preferably 1–12%, especially 1–10%, by weight.

By its very nature and intended use as tableware and/or decorative crystal glassware, the glass composition of the present invention is desirably substantially colorless, i.e. coloring component-free. Advantageously, the glass of the present invention is of constant and uniform quality and properties throughout its mass or extent.

It is intended that the examples herein are given only as practical demonstrations of the invention, this invention being able to vary without, however, departing from the scope of the concept defined by the invention itself.

While specific embodiments of the invention have been shown and described in detail to illustrate the application of the principles of the invention, it will be understood that the invention may be embodied otherwise without departing from such principles.

What is claimed is:

1. Essentially lead-free, substantially cesium-free, decolorized glass of improved workability and fusibility, having the characteristics of lead crystal without the presence of lead, a density greater than 2.9 g/cm³ and a refractive index greater than 1.545, and at most 1% by weight $Cs_2O$ as an impurity, and suitable for use as imitation lead crystal tableware and decorative crystal glassware, and comprising the following percentage by weight oxide composition:

| | | | |
|---|---|---|---|
| $SiO_2$ | 50–58 | $CaO + MgO + Al_2O_3$ | 0–4 |
| $K_2O$ | 0–13 | $TiO_2 + ZrO_2 + Y_2O_3$ | 0–6 |
| $Na_2O$ | 0–9 | $SnO_2 + GeO_2$ | 0–5 |
| $Li_2O$ | 0–4 | $BaO + La_2O_3 + Nb_2O_5 + Bi_2O_3$ | 7–14 |
| CaO | 0–3 | $SiO_2 + Al_2O_3$ | 52–58 |
| MgO | 0–4 | $K_2O + Na_2O + Li_2O$ | 12–18 |
| $B_2O_3$ | 0–2 | $ZnO + BaO + La_2O_3 + Nb_2O_5 + Bi_2O_3$ | 26–33 |
| ZnO | 16–30 | $SiO_2 + K_2O + Na_2O + Li_2O + ZnO + BaO + Al_2O_3 + La_2O_3 + Nb_2O_5 + Bi_2O_3$ | at least 90 |
| BaO | 0–13 | | |
| $TiO_2$ | 0–6 | | |
| $ZrO_2$ | 0–5 | | |
| $Y_2O_3$ | 0–5 | | |
| $Al_2O_3$ | 0–3 | | |
| $SnO_2$ | 0–5 | | |
| $La_2O_3$ | 0–9 | | |
| $Nb_2O_5$ | 0–9 | | |
| $Bi_2O_3$ | 0–13 | | |
| $GeO_2$ | 0–5 | | | wherein the glass composition contains one or more of $Sb_2O_3$, $As_2O_3$, NiO, CoO, $MnO_2$, $Er_2O_3$, $Nd_2O_3$, SeO and $CeO_2$ as refining and decolorizing agents in a total amount of below 2% by weight, with the $Sb_2O_3$ content being 0–1% by weight.

2. Glass of claim 1 wherein, when $K_2O$ and $Na_2O$ are both present, the molar ratio of $K_2O$ to $Na_2O$ is 0.9–2:1, and when BaO and ZnO are both present, the molar ratio of BaO to ZnO is below 0.44:1, and wherein the glass has an index of optical dispersion Abbe number below 56.

3. Glass of claim 1 having the following percentage by weight oxide composition:

| | | | |
|---|---|---|---|
| $SiO_2$ | 53–57 | $TiO_2 + ZrO_2$ | 0–6 |
| $K_2O$ | 7–12 | $K_2O + Na_2O + Li_2O$ | 12–17 |
| $Na_2O$ | 3–6 | $ZnO + BaO$ | 26–30 |
| $Li_2O$ | 0–2 | $SiO_2 + K_2O + Na_2O + Li_2O + ZnO + BaO$ | at least 91 |
| MgO | 0–2 | | |
| $B_2O_3$ | 0–1 | | |
| ZnO | 16–22 | | |
| BaO | 7–13 | | |
| $TiO_2$ | 0–6 | | |
| $ZrO_2$ | 0–3 | | |
| $Sb_2O_3$ | 0–1. | | |

4. Essentially lead-free, substantially cesium-free, decolorized glass of improved workability and fusibility, having the characteristics of lead crystal without the presence of lead, a density greater than 2.9 g/cm³ and a refractive index greater than 1.545, and at most 1% by weight $Cs_2O$ as an impurity, and suitable for use as imitation lead crystal tableware and decorative crystal glassware, and having the following percentage by weight oxide composition:

| | | | |
|---|---|---|---|
| $SiO_2$ | 53.5–54.5 | $SiO_2 + K_2O + Na_2O + ZnO + BaO + TiO_2 + Sb_2O_3$ | at least 96.72 |
| $K_2O$ | 7.5–8.5 | | |
| $Na_2O$ | 4.5–5.5 | | |
| ZnO | 18–19 | | |
| BaO | 9.5–10.5 | | |
| $TiO_2$ | 3.5–4.5 | | |
| $Sb_2O_3$ | 0.22–0.27 | | | wherein the glass composition optionally contains one or more of $As_2O_3$, NiO, CoO, $MnO_2$, $Er_2O_3$, $Nd_2O_3$, SeO and $CeO_2$, along with said $Sb_2O_3$, as refining and decolorizing agents in a total amount of below 2% by weight, thereby providing a decolorized glass.

5. Glass of claim 1 having the following percentage by weight oxide composition:

| | | | |
|---|---|---|---|
| $SiO_2$ | 55.5–56.5 | $SiO_2 + K_2O + Na_2O + ZnO + BaO + TiO_2 + Sb_2O_3$ | at least 96.3 |
| $K_2O$ | 8–9 | | |
| $Na_2O$ | 4–5 | | |
| ZnO | 16.5–17.5 | | |
| BaO | 10.5–11.5 | | |
| $TiO_2$ | 1.5–2.5 | | |
| $Sb_2O_3$ | 0.73–0.77. | | |

6. Glass of claim 1 having the following percentage by weight oxide composition:

| | | | |
|---|---|---|---|
| $SiO_2$ | 54.5–55.5 | $SiO_2 + K_2O + Na_2O + ZnO + BaO + TiO_2 + Sb_2O_3$ | at least 97.23 |
| $K_2O$ | 7.5–8.5 | | |
| $Na_2O$ | 4.5–5.5 | | |
| ZnO | 16–16.5 | | |
| BaO | 10.5–11.5 | | |
| $TiO_2$ | 3.5–4.5 | | |
| $Sb_2O_3$ | 0.73–0.77. | | |

7. Essentially lead-free, substantially cesium-free, decolorized glass of improved workability and fusibility, having the characteristics of lead crystal without the presence of lead, a density greater than 2.9 g/cm³ and a refractive index greater than 1.545, and at most 1% by weight $Cs_2O$ as an impurity, and suitable for use as imitation lead crystal tableware and decorative crystal glassware, and having the following percentage by weight oxide composition:

| | | | |
|---|---|---|---|
| $SiO_2$ | 53.5–54.5 | $SiO_2 + K_2O + Na_2O + ZnO + BaO + Sb_2O_3$ | at least 97.23 |
| $K_2O$ | 10–11 | | |
| $Na_2O$ | 5–6 | | |
| ZnO | 18.5–19.5 | | |
| BaO | 9.5–10.5 | | |
| $Sb_2O_3$ | 0.73–0.77 | | | wherein the glass composition optionally contains one or more of $As_2O_3$, NiO, CoO, $MnO_2$, $Er_2O_3$, $Nd_2O_3$, SeO and $CeO_2$, along with said $Sb_2O_3$, as refining and decolorizing agents in a total amount of below 2% by weight, thereby providing a decolorized glass.

8. Essentially lead-free, substantially cesium-free, decolorized glass of improved workability and fusibility, having the characteristics of lead crystal without the presence of lead, a density greater than 2.9 g/cm³ and a refractive index greater than 1.545, and at most 1% by weight $Cs_2O$ as an impurity, and suitable for use as imitation lead crystal tableware and decorative crystal glassware, and having the following percentage by weight oxide composition:

| | | | |
|---|---|---|---|
| $SiO_2$ | 53–57 | $TiO_2 + ZrO_2 + Y_2O_3$ | 0–6 |
| $K_2O$ | 7–12 | $BaO + Bi_2O_3$ | 7–14 |
| $Na_2O$ | 3–6 | $SiO_2 + Al_2O_3$ | 53–57 |
| $Li_2O$ | 0–1 | $K_2O + Na_2O + Li_2O$ | 12–17 |
| $B_2O_3$ | 0–1 | $ZnO + BaO + Bi_2O_3$ | 26–30 |
| ZnO | 16–22 | $SiO_2 + K_2O + Na_2O + Li_2O +$ | at least |
| | | $ZnO + BaO + Al_2O_3 + Bi_2O_3$ | 91 |
| BaO | 0–13 | | |
| $TiO_2$ | 0–6 | | |
| $ZrO_2$ | 0–2 | | |
| $Y_2O_3$ | 0–1 | | |
| $Al_2O_3$ | 0–1 | | |
| $Bi_2O_3$ | 1–13 | | |
| $Sb_2O_3$ | 0–1 | | | wherein the glass composition optionally contains one or more of $As_2O_3$, NiO, CoO, $MnO_2$, $Er_2O_3$, $Nd_2O_3$, SeO and $CeO_2$, along with said $Sb_2O_3$, as refining and decolorizing agents in a total amount of below 2% by weight, thereby providing a decolorized glass.

9. Essentially lead-free, substantially cesium-free, decolorized glass of improved workability and fusibility, having the characteristics of lead crystal without the presence of lead, a density greater than 2.9 g/cm³ and a refractive index greater than 1.545, and at most 1% by weight $Cs_2O$ as an impurity, and suitable for use as imitation lead crystal tableware and decorative crystal glassware, and having the following percentage by weight oxide composition:

| | | | |
|---|---|---|---|
| $SiO_2$ | 54.5–55.5 | $SiO_2 + K_2O + Na_2O + ZnO +$ | at least |
| | | $BaO + Bi_2O_3 + Sb_2O_3$ | 97.23 |
| $K_2O$ | 10.5–11.5 | | |
| $Na_2O$ | 5–6 | | |
| ZnO | 18.5–19.5 | | |
| BaO | 5.5–6.5 | | |
| $Bi_2O_3$ | 2.5–3.5 | | |
| $Sb_2O_3$ | 0.73–0.77 | | | wherein the glass composition optionally contains one or more of $As_2O_3$, NiO, CoO, $MnO_2$, $Er_2O_3$, $Nd_2O_3$, SeO and $CeO_2$, along with said $Sb_2O_3$, as refining and decolorizing agents in a total amount of below 2% by weight, thereby providing a decolorized glass.

10. Essentially lead-free, substantially cesium-free, decolorized glass of improved workability and fusibility, having the characteristics of lead crystal without the presence of lead, a density greater than 2.9 g/cm³ and a refractive index greater than 1.545, and at most 1% by weight $Cs_2O$ as an impurity, and suitable for use as imitation lead crystal tableware and decorative crystal glassware, and having the following percentage by weight oxide composition:

| | | | |
|---|---|---|---|
| $SiO_2$ | 54.5–55.5 | $SiO_2 + K_2O + Na_2O + ZnO +$ | at least |
| | | $Bi_2O_3 + Sb_2O_3$ | 97.73 |
| $K_2O$ | 10.5–11.5 | | |
| $Na_2O$ | 5–6 | | |
| ZnO | 18.5–19.5 | | |
| $Bi_2O_3$ | 8.5–9.5 | | |
| $Sb_2O_3$ | 0.73–0.77 | | | wherein the glass composition optionally contains one or more of $As_2O_3$, NiO, CoO, $MnO_2$, $Er_2O_3$, $Nd_2O_3$, SeO and $CeO_2$, along with said $Sb_2O_3$, as refining and decolorizing agents in a total amount of below 2% by weight, thereby providing a decolorized glass.

11. Essentially lead-free, substantially cesium-free, and colorless glass having the characteristics of lead crystal without the presence of lead, a density greater than 2.9 g/cm³ and a refractive index greater than 1.545, and at most 1% by weight $Cs_2O$ as an impurity, and consisting essentially of the following percentage by weight oxide composition:

| | | | |
|---|---|---|---|
| $SiO_2$ | 50–58 | $CaO + MgO + Al_2O_3$ | 0–4 |
| $K_2O$ | 0–13 | $TiO_2 + ZrO_2 + Y_2O_3$ | 0–6 |
| $Na_2O$ | 0–9 | $SnO_2 + GeO_2$ | 0–5 |
| $Li_2O$ | 0–4 | $BaO + La_2O_3 + Nb_2O_5 + Bi_2O_3$ | 7–14 |
| CaO | 0–3 | $SiO_2 + Al_2O_3$ | 52–58 |
| MgO | 0–4 | $K_2O + Na_2O + Li_2O$ | 12–18 |
| $B_2O_3$ | 0–2 | $ZnO + BaO + La_2O_3 + Nb_2O_5 + Bi_2O_3$ | 26–33 |
| ZnO | 16–30 | $SiO_2 + K_2O + Na_2O + Li_2O + ZnO +$ | at least |
| | | $BaO + Al_2O_3 + La_2O_3 + Nb_2O_5 + Bi_2O_3$ | 90 |
| BaO | 0–13 | | |
| $TiO_2$ | 0–6 | | |
| $ZrO_2$ | 0–5 | | |
| $Y_2O_3$ | 0–5 | | |
| $Al_2O_3$ | 0–3 | | |
| $SnO_2$ | 0–5 | | |
| $La_2O_3$ | 0–9 | | |
| $Nb_2O_5$ | 0–9 | | |
| $Bi_2O_3$ | 0–13 | | |
| $GeO_2$ | 0–5. | | |

12. Glass of claim 11 wherein the glass composition is free of coloring components and further consists essentially of one or more of $Sb_2O_3$, $As_2O_3$, NiO, CoO, $MnO_2$, $Er_2O_3$, $Nd_2O_3$, SeO and $CeO_2$ as refining and decolorizing agents in a total amount of below 2% by weight, with the $Sb_2O_3$ content being 0–1% by weight, thereby providing a decolorized glass.

13. Glass of claim 11 wherein, when $K_2O$ and $Na_2O$ are both present, the molar ratio of $K_2O$ to $Na_2O$ is 0.9–2:1.

14. Glass of claim 11 wherein, when BaO and ZnO are both present, the molar ratio of BaO to ZnO is below 0.44:1.

15. Glass of claim 14 wherein said molar ratio is 0.14–0.43:1.

16. Glass of claim 11 wherein the glass has an index of optical dispersion Abbe number below 56.

17. Glass of claim 12 having the following percentage by weight oxide composition:

| | | | |
|---|---|---|---|
| $SiO_2$ | 53–57 | $TiO_2 + ZrO_2$ | 0–6 |
| $K_2O$ | 7–12 | $K_2O + Na_2O + Li_2O$ | 12–17 |
| $Na_2O$ | 3–6 | $ZnO + BaO$ | 26–30 |
| $Li_2O$ | 0–2 | $SiO_2 + K_2O + Na_2O + Li_2O +$ | at least |
| | | $ZnO + BaO$ | 91 |
| MgO | 0–2 | | |
| $B_2O_3$ | 0–1 | | |
| ZnO | 16–22 | | |
| BaO | 7–13 | | |
| $TiO_2$ | 0–6 | | |
| $ZrO_2$ | 0–3 | | |
| $Sb_2O_3$ | 0–1 | | | wherein the glass composition is free of coloring components and optionally further consists essentially of one or more of $As_2O_3$, NiO, CoO, $MnO_2$, $Er_2O_3$, $Nd_2O_3$, SeO and $CeO_2$, along with said $Sb_2O_3$, as refining and decolorizing agents in a total amount of below 2% by weight, thereby providing a decolorized glass.

18. Essentially lead-free, substantially cesium-free, and colorless glass having the characteristics of lead crystal without the presence of lead, a density greater than 2.9 g/cm³ and a refractive index greater than 1.545, and at most 1% by weight $Cs_2O$ as an impurity, and consisting essentially of the following percentage by weight oxide composition:

| | | | |
|---|---|---|---|
| SiO$_2$ | 53.5–54.5 | SiO$_2$ + K$_2$O + Na$_2$O + ZnO + BaO + TiO$_2$ + Sb$_2$O$_3$ | at least 96.72 |
| K$_2$O | 7.5–8.5 | | |
| Na$_2$O | 4.5–5.5 | | |
| ZnO | 18–19 | | |
| BaO | 9.5–10.5 | | |
| TiO$_2$ | 3.5–4.5 | | |
| Sb$_2$O$_3$ | 0.22–0.27 | | | wherein the glass composition is free of coloring components and optionally further consists essentially of one or more of As$_2$O$_3$, NiO, CoO, MnO$_2$, Er$_2$O$_3$, Nd$_2$O$_3$, SeO and CeO$_2$, along with said Sb$_2$O$_3$, as refining and decolorizing agents in a total amount of below 2% by weight, thereby providing a decolorized glass.

19. Glass of claim 12 having the following percentage by weight oxide composition:

| | | | |
|---|---|---|---|
| SiO$_2$ | 55.5–56.5 | SiO$_2$ + K$_2$O + Na$_2$O + ZnO + BaO + TiO$_2$ + Sb$_2$O$_3$ | at least 96.73 |
| K$_2$O | 8–9 | | |
| Na$_2$O | 4–5 | | |
| ZnO | 16.5–17.5 | | |
| BaO | 10.5–11.5 | | |
| TiO$_2$ | 1.5–2.5 | | |
| Sb$_2$O$_3$ | 0.73–0.77 | | | wherein the glass composition is free of coloring components and optionally further consists essentially of one or more of As$_2$O$_3$, NiO, CoO, MnO$_2$, Er$_2$O$_3$, Nd$_2$O$_3$, SeO and CeO$_2$, along with said Sb$_2$O$_3$, as refining and decolorizing agents in a total amount of below 2% by weight, thereby providing a decolorized glass.

20. Glass of claim 12 having the following percentage by weight oxide composition:

| | | | |
|---|---|---|---|
| SiO$_2$ | 54.5–55.5 | SiO$_2$ + K$_2$O + Na$_2$O + ZnO + BaO + TiO$_2$ + Sb$_2$O$_3$ | at least 97.23 |
| K$_2$O | 7.5–8.5 | | |
| Na$_2$O | 4.5–5.5 | | |
| ZnO | 16–16.5 | | |
| BaO | 10.5–11.5 | | |
| TiO$_2$ | 3.5–4.5 | | |
| Sb$_2$O$_3$ | 0.73–0.77 | | | wherein the glass composition is free of coloring components and optionally further consists essentially of one or more of As$_2$O$_3$, NiO, CoO, MnO$_2$, Er$_2$O$_3$, Nd$_2$O$_3$, SeO and CeO$_2$, along with said Sb$_2$O$_3$, as refining and decolorizing agents in a total amount of below 2% by weight, thereby providing a decolorized glass.

21. Essentially lead-free, substantially cesium-free, and colorless glass having the characteristics of lead crystal without the presence of lead, a density greater than 2.9 g/cm$^3$ and a refractive index greater than 1.545, and at most 1% by weight Cs$_2$O as an impurity, and consisting essentially of the following percentage by weight oxide composition:

| | | | |
|---|---|---|---|
| SiO$_2$ | 53.5–54.5 | SiO$_2$ +K$_2$O + Na$_2$O + ZnO + BaO + Sb$_2$O$_3$ | at least 97.23 |
| K$_2$O | 10–11 | | |
| Na$_2$O | 5–6 | | |
| ZnO | 18.5–19.5 | | |
| BaO | 9.5–10.5 | | |
| Sb$_2$O$_3$ | 0.73–0.77 | | | wherein the glass composition is free of coloring components and optionally further consists essentially of one or more of As$_2$O$_3$, NiO, CoO, MnO$_2$, Er$_2$O$_3$, Nd$_2$O$_3$, SeO and CeO$_2$, along with said Sb$_2$O$_3$, as refining and decolorizing agents in a total amount of below 2% by weight, thereby providing a decolorized glass.

22. Essentially lead-free, substantially cesium-free, and colorless glass having the characteristics of lead crystal without the presence of lead, a density greater than 2.9 g/cm$^3$ and a refractive index greater than 1.545, and at most 1% by weight Cs$_2$O as an impurity, and consisting essentially of the following percentage by weight oxide composition:

| | | | |
|---|---|---|---|
| SiO$_2$ | 53–57 | TiO$_2$ + ZrO$_2$ + Y$_2$O$_3$ | 0–6 |
| K$_2$O | 7–12 | BaO + Bi$_2$O$_3$ | 7–14 |
| Na$_2$O | 3–6 | SiO$_2$ + Al$_2$O$_3$ | 53–57 |
| Li$_2$O | 0–1 | K$_2$O + Na$_2$O + Li$_2$O | 12–17 |
| B$_2$O$_3$ | 0–1 | ZnO + BaO + Bi$_2$O$_3$ | 26–30 |
| ZnO | 16–22 | SiO$_2$ + K$_2$O + Na$_2$O + Li$_2$O + ZnO + BaO + Al$_2$O$_3$ + Bi$_2$O$_3$ | at least 91 |
| BaO | 0–13 | | |
| TiO$_2$ | 0–6 | | |
| ZrO$_2$ | 0–2 | | |
| Y$_2$O$_3$ | 0–1 | | |
| Al$_2$O$_3$ | 0–1 | | |
| Bi$_2$O$_3$ | 1–13 | | |
| Sb$_2$O$_3$ | 0–1 | | | wherein the glass composition is free of coloring components and optionally further consists essentially of one or more of As$_2$O$_3$, NiO, CoO, MnO$_2$, Er$_2$O$_3$, Nd$_2$O$_3$, SeO and CeO$_2$, along with said Sb$_2$O$_3$, as refining and decolorizing agents in a total amount of below 2% by weight, thereby providing a decolorized glass.

23. Essentially lead-free, substantially cesium-free, and colorless glass having the characteristics of lead crystal without the presence of lead, a density greater than 2.9 g/cm$^3$ and a refractive index greater than 1.545, and at most 1% by weight Cs$_2$O as an impurity, and consisting essentially of the following percentage by weight oxide composition:

| | | | |
|---|---|---|---|
| SiO$_2$ | 54.5–55.5 | SiO$_2$ + K$_2$O + Na$_2$O + ZnO + BaO + Bi$_2$O$_3$ + Sb$_2$O$_3$ | at least 97.23 |
| K$_2$O | 10.5–11.5 | | |
| Na$_2$O | 5–6 | | |
| ZnO | 18.5–19.5 | | |
| BaO | 5.5–6.5 | | |
| Bi$_2$O$_3$ | 2.5–3.5 | | |
| Sb$_2$O$_3$ | 0.73–0.77 | | | wherein the glass composition is free of coloring components and optionally further consists essentially of one or more of As$_2$O$_3$, NiO, CoO, MnO$_2$, Er$_2$O$_3$, Nd$_2$O$_3$, SeO and CeO$_2$, along with said Sb$_2$O$_3$, as refining and decolorizing agents in a total amount of below 2% by weight, thereby providing a decolorized glass.

24. Essentially lead-free, substantially cesium-free, and colorless glass having the characteristics of lead crystal without the presence of lead, a density greater than 2.9 g/cm$^3$ and a refractive index greater than 1.545, and at most 1% by weight $Cs_2O$ as an impurity, and consisting essentially of the following percentage by weight oxide composition:

| | | | |
|---|---|---|---|
| $SiO_2$ | 54.5–55.5 | $SiO_2 + K_2O + Na_2O + ZnO + Bi_2O_3 + Sb_2O_3$ | at least 97.73 |
| $K_2O$ | 10.5–11.5 | | |
| $Na_2O$ | 5–6 | | |
| ZnO | 18.5–19.5 | | |
| $Bi_2O_3$ | 8.5–9.5 | | |
| $Sb_2O_3$ | 0.73–0.77 | | | wherein the glass composition is free of coloring components and optionally further consists essentially of one or more of $As_2O_3$, NiO, CoO, $MnO_2$, $Er_2O_3$, $Nd_2O_3$, SeO and $CeO_2$, along with said $Sb_2O_3$, as refining and decolorizing agents in a total amount of below 2% by weight, thereby providing a decolorized glass.

25. Essentially lead-free, substantially cesium-free, and colorless glass having a density greater than 2.9 g/cm³ and a refractive index greater than 1.545, and at most 1% by weight $Cs_2O$ as an impurity, and selected from the group consisting of:

(1) a glass having the following percentage by weight oxide composition:

| | | | |
|---|---|---|---|
| $SiO_2$ | 53.5–54.5 | $SiO_2 + K_2O + Na_2O + ZnO + BaO + TiO_2 + Sb_2O_3$ | at least 96.72 |
| $K_2O$ | 7.5–8.5 | | |
| $Na_2O$ | 4.5–5.5 | | |
| ZnO | 18–19 | | |
| BaO | 9.5–10.5 | | |
| $TiO_2$ | 3.5–4.5 | | |
| $Sb_2O_3$ | 0.22–0.27, | | |

(2) a glass having the following percentage by weight oxide composition:

| | | | |
|---|---|---|---|
| $SiO_2$ | 55.5–56.5 | $SiO_2 + K_2O + Na_2O + ZnO + BaO + TiO_2 + Sb_2O_3$ | at least 9.73 |
| $K_2O$ | 8–9 | | |
| $Na_2O$ | 4–5 | | |
| ZnO | 16.5–17.5 | | |
| BaO | 10.5–11.5 | | |
| $TiO_2$ | 1.5–2.5 | | |
| $Sb_2O_3$ | 0.73–0.77, | | |

(3) a glass having the following percentage by weight oxide composition:

| | | | |
|---|---|---|---|
| $SiO_2$ | 54.5–55.5 | $SiO_2 + K_2O + Na_2O + ZnO + BaO + TiO_2 + Sb_2O_3$ | at least 97.23 |
| $K_2O$ | 7.5–8.5 | | |
| $Na_2O$ | 4.5–5.5 | | |
| ZnO | 16–16.5 | | |
| BaO | 10.5–11.5 | | |
| $TiO_2$ | 3.5–4.5 | | |
| $Sb_2O_3$ | 0.73–0.77, and | | |

(4) a glass having the following percentage by weight oxide composition:

| | | | |
|---|---|---|---|
| $SiO_2$ | 53.5–54.5 | $SiO_2 + K_2O + Na_2O + ZnO + BaO + Sb_2O_3$ | at least 97.23 |
| $K_2O$ | 10–11 | | |
| $Na_2O$ | 5–6 | | |
| ZnO | 18.5–19.5 | | |
| BaO | 9.5–10.5 | | |
| $Sb_2O_3$ | 0.73–0.77. | | |

26. Glass of claim 25 wherein the corresponding glass (1), (2), (3) and (4) each respectively is free of coloring components and further consists essentially of one or more of $As_2O_3$, NiO, CoO, $MnO_2$, $Er_2O_3$, $Nd_2O_3$, SeO and $CeO_2$, along with said $Sb_2O_3$, as refining and decolorizing agents in a total amount of below 2% by weight, thereby providing a decolorized glass.

27. Essentially lead-free, substantially cesium-free, and colorless glass having a density greater than 2.9 g/cm³ and a refractive index greater than 1.545, and at most 1% by weight $Cs_2O$ as an impurity, and selected from the group consisting of:

(1) a glass having the following percentage by weight oxide composition:

| | | | |
|---|---|---|---|
| $SiO_2$ | 54.5–55.5 | $SiO_2 + K_2O + Na_2O + ZnO + BaO + Bi_2O_3 + Sb_2O_3$ | at least 97.23 |
| $K_2O$ | 10.5–11.5 | | |
| $Na_2O$ | 5–6 | | |
| ZnO | 18.5–19.5 | | |
| BaO | 5.5–6.5 | | |
| $Bi_2O_3$ | 2.5–3.5 | | |
| $Sb_2O_3$ | 0.73–0.77, and | | |

(2) a glass having the following percentage by weight oxide composition:

| | | | |
|---|---|---|---|
| $SiO_2$ | 54.5–55.5 | $SiO_2 + K_2O + Na_2O + ZnO + Bi_2O_3 + Sb_2O_3$ | at least 97.73 |
| $K_2O$ | 10.5–11.5 | | |
| $Na_2O$ | 5–6 | | |
| ZnO | 18.5–19.5 | | |
| $Bi_2O_3$ | 8.5–9.5 | | |
| $Sb_2O_3$ | 0.73–0.77. | | |

28. Glass of claim 27 wherein the corresponding glass (1) and (2) each respectively is free of coloring components and further consists essentially of one or more of, $As_2O_3$, NiO, CoO, $MnO_2$, $Er_2O_3$, $Nd_2O_3$, SeO and $CeO_2$, along with said $Sb_2O_3$, as refining and decolorizing agents in a total amount of below 2% by weight, thereby providing a decolorized glass.

* * * * *